A. C. DELAPLAINE.
CHART FOR ILLUSTRATING THE SUBDIVISION OF MEAT CARCASSES INTO CUTS OF MEAT.
APPLICATION FILED AUG. 24, 1921.

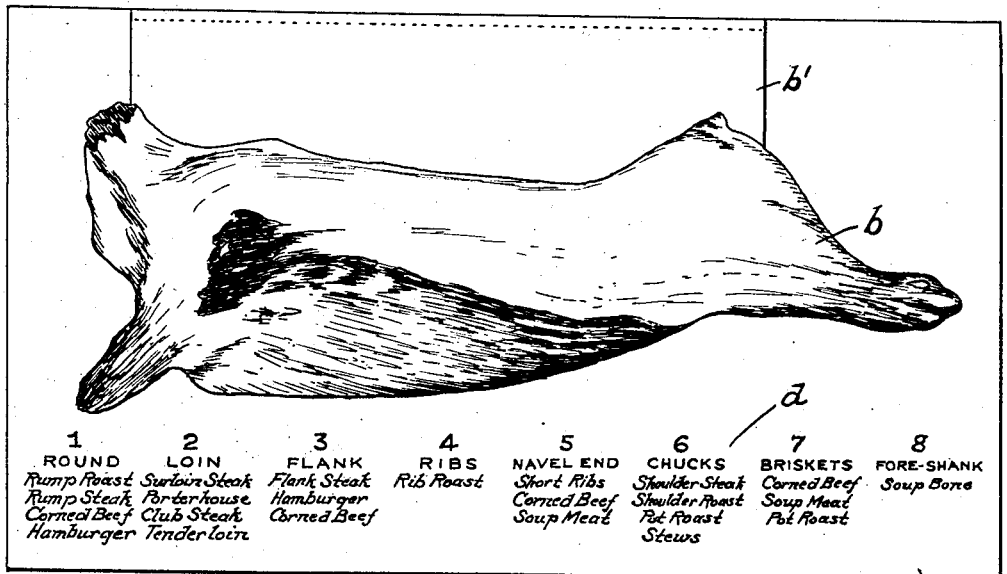
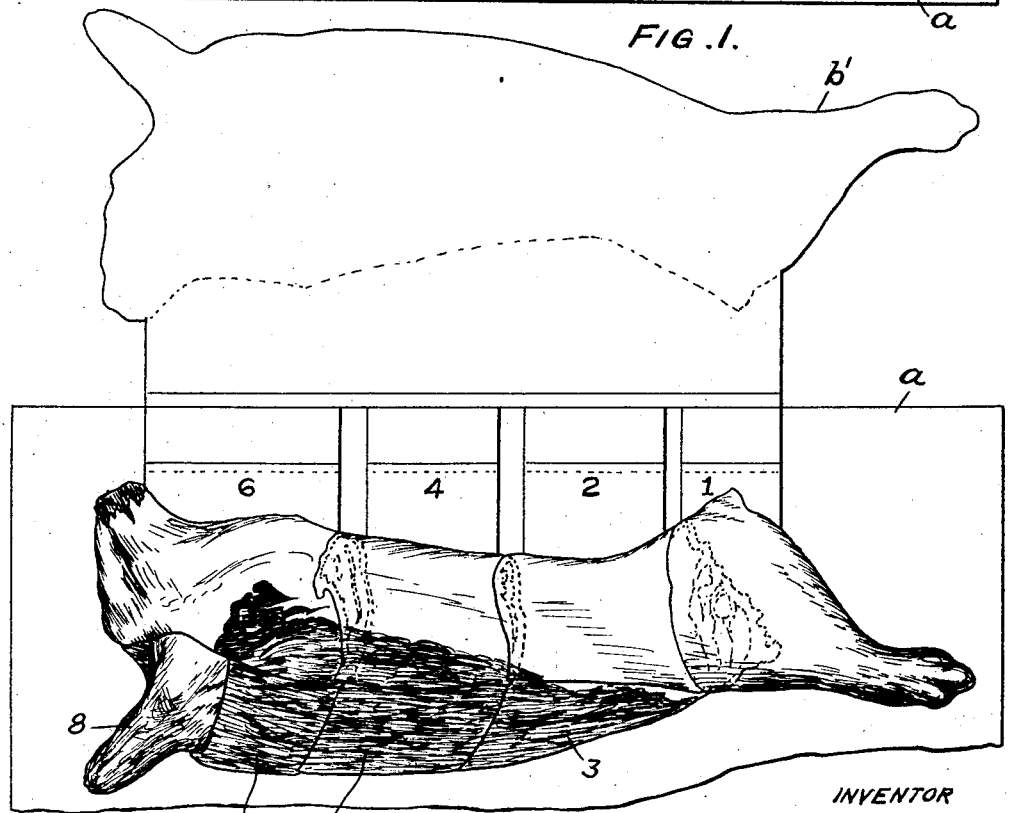

1,403,896.  Patented Jan. 17, 1922.

WITNESS:
Rob't R. Kitchel.

INVENTOR
Aubrey C. Delaplaine
BY
Frank L. Busser
ATTORNEY.

UNITED STATES PATENT OFFICE.

AUBREY C. DELAPLAINE, OF CYNWYD, PENNSYLVANIA, ASSIGNOR TO BREUKER & KESSLER COMPANY, OF PHILADELPHIA, PENNSYLVANIA, A CORPORATION OF PENNSYLVANIA.

CHART FOR ILLUSTRATING THE SUBDIVISION OF MEAT CARCASSES INTO CUTS OF MEAT.

1,403,896.    Specification of Letters Patent.    Patented Jan. 17, 1922.

Continuation of application Serial No. 438,910, filed January 21, 1921. This application filed August 24, 1921. Serial No. 495,128.

*To all whom it may concern:*

Be it known that I, AUBREY C. DELAPLAINE, a citizen of the United States, residing at Cynwyd, county of Montgomery, and State of Pennsylvania, have invented a new and useful Improvement in Charts for Illustrating the Subdivision of Meat Carcasses into Cuts of Meat, of which the following is a full, clear, and exact description, reference being had to the accompanying drawings, which form a part of this specification.

The object of my invention is to provide a novel form of chart whereby meat carcasses may be illustrated in connection with sectional illustrations of the various cuts of meats, the whole being so assembled that the cuts will bear their exact relative location to each other and to the carcass.

In the known methods of charting or illustrating, great difficulty is found in so illustrating as to clearly show the form and relative position of the cuts of meat and in clearly defining the exact relative position and lines of cut of the different cuts, relative to each other and to the carcass.

By virtue of my invention, a carcass may be illustrated and the size and relative positions of the component cuts of meat, relative to the whole, may be shown with exactness and complete clarity.

My invention is of especial value in illustrating, for example, the lines of cut and the cuts of beeves, hogs, sheep, etc., and in graphically showing to purchasers of meats the subdivision of the carcass into the various cuts.

I will now describe my invention in detail with reference to the accompanying drawings, in which I have illustrated my invention as applied to the illustration of a side of beef—

Fig. 1 is a plan view of the mount and of a chart illustrative of cuts of a side of beef.

Fig. 2 is a plan view of the same, with the tab carrying the normally overlying illustration of a complete side of folder back to expose the faces of a series of separate cuts.

Figure 3:
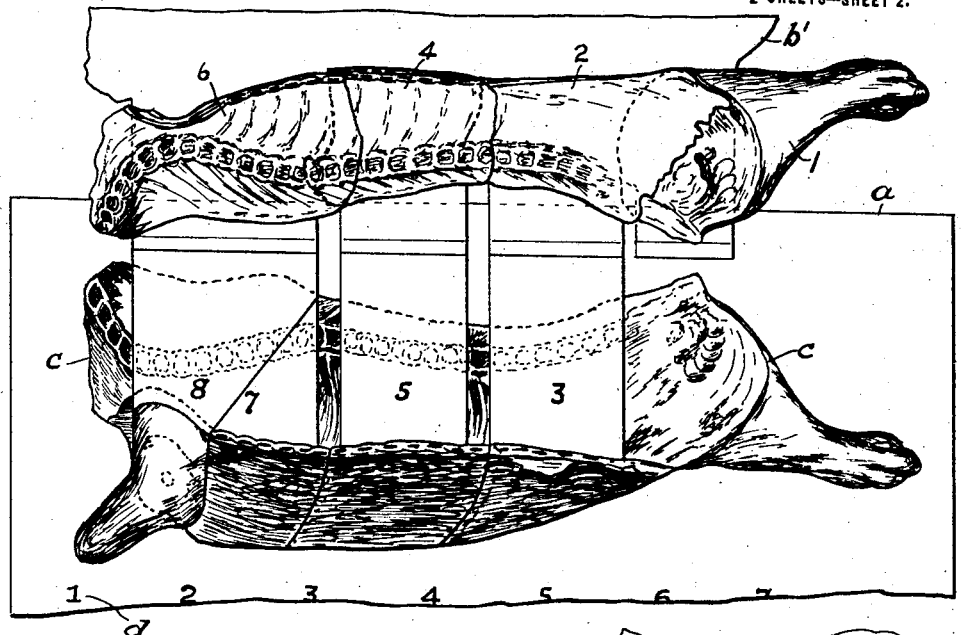
Fig. 3 is another plan view of the same, with the tabs carrying the series of cuts shown in Fig. 2 folded back to expose their rear faces and exposing the faces of another series of separate cuts.

To one edge of a mount $a$ is hinged a tab $b'$ carrying a pictorial representation $b$ of a side of beef. Beneath the elements $b$ and $b'$ are secured, in hinged relation to the mount, other tabs carrying pictorial representations, partly overlapping, of separate through cuts into which the side of beef is subdivided. These separate sections are of the form and illustrative of the round 1, loin 2, flank 3, ribs 4, navel end 5, chucks 6, briskets 7 and foreshank 8. These cuts are arranged in proper normal relation to the representation $b$ of entire side and to each other and illustrate not only the faces of the cuts but also the cross-sectional structure of the same on the lines of cut. Beneath the sections 1 to 8 inclusive the mount carries another pictorial representation $c$ of a side of beef in proper relationship to the cuts 1–8 and coinciding in contour with the representation $b$.

Figures 4, 5:
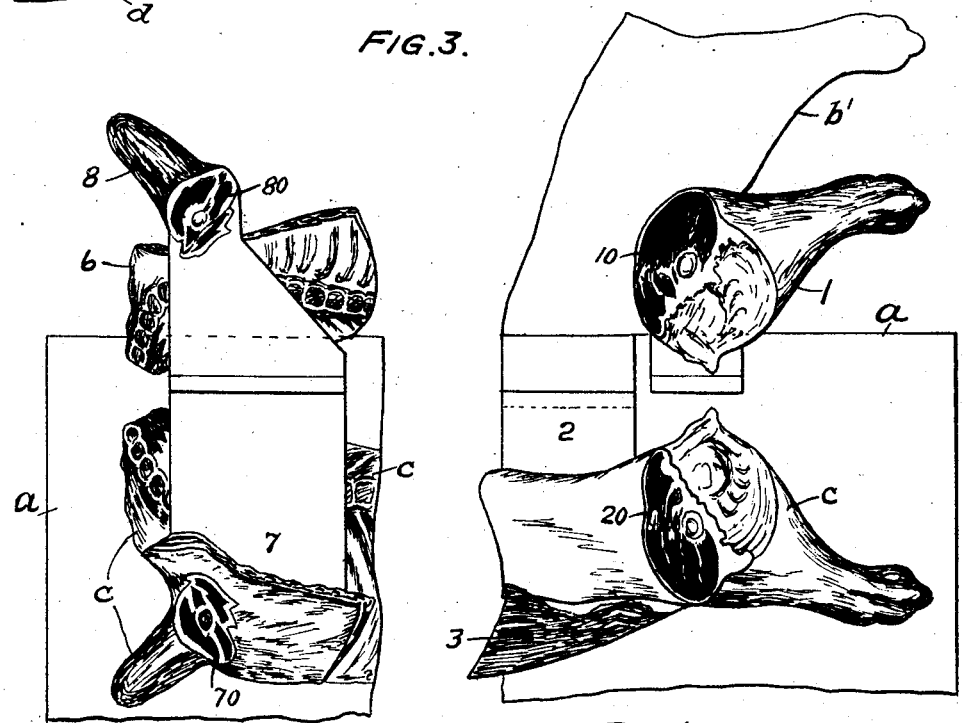
Figs. 4 and 5 are detail views.

By referring, for example, to the section 2, (See Fig. 5) 20 represents the cross-sectional structure on the line of cut between the loin 2 and the round 1. Each section is also similarly illustrated on the rear face. For example, 10 on the rear of section 1 also represents the cross-sectional structure on the line of cut between the loin 2 and the round 1. Other typical cross-sectional structures are shown at 80 in Fig. 4 on the rear of section 8 and at 70 on the face of section 7.

It will thus be understood that in the completed chart the sections illustrative of the cuts of meat will show, at a glance, the location and lines of cut of the various cuts in their exact relations to each other and to the entire side of beef illustrated at $b$ and $c$.

Numerals corresponding to the reference letters 1 to 8 inclusive are preferably applied to the tabs, and on the face of the mount these numerals are listed together with the names definitive of the various cuts and the various articles of food which are derivable from each cut, as shown at $d$.

One or both of the pictorial representations $b$ and $c$ of the sides of beef may be omitted. The cross-sectional illustrations on one of the faces of each cut may also be omitted, as may also be the numerals on the various tabs and the legends d on the face of the mount, without departing from the broader scope of my invention; but these elements are preferably included in that they assist in clarifying an understanding of the structure of the carcass and the edible meats producible therefrom as well as of the structure of the different cuts.

It will be obvious that my invention may be as readily applied to the illustration of the carcasses of hogs, sheep, or other food animals.

This application is a continuation of an application filed by me January 21, 1921, Serial No. 438,910.

Having now fully described my invention, what I claim and desire to protect by Letters Patent is—

1. A chart illustrating the cuts of meat of a side of an edible carcass, comprising a plurality of movable tabs arranged in order to illustrate the various through cuts into which the side is subdivided and their relation to each other, and also to illustrate the structure of the cross-section at the cuts as well as the faces thereof.

2. A chart for illustrating the subdivisions of a side of an edible carcass into cuts of meat comprising a mount, an illustration of a side of an edible carcass attached to the mount and a plurality of independent illustrations in perspective of cuts of meat attached to said mount, the illustration of the carcass being in superimposed relation to the illustration of the cuts, the illustrations of the cuts being so disposed in relation to each other as to illustrate the various subdivisions of the carcass in their normal relationship and at the same time illustrate the cross-sectional structure of the cuts of meat on the lines of the cut.

3. A chart illustrating the cuts of meat of a side of an edible carcass, comprising a plurality of movable tabs arranged to illustrate the various through cuts into which the side is subdivided and their relation to each other, said tabs being illustrated on both faces to show the cross sections between adjacent cuts.

4. A chart illustrating the cuts of meat of a side of an edible carcass, comprising a plurality of movable tabs arranged to illustrate the various through cuts into which the side is subdivided and their relation to each other, certain illustrations of adjacent cuts overlapping along their edges and the overlapping sections being illustrated to represent the cross-sectional structure on the lines of cut between the cuts represented by such overlapping illustrations.

In testimony of which invention, I have hereunto set my hand, at Philadelphia, Penna., on this 22nd day of August, 1921.

AUBREY C. DELAPLAINE.